Figure 1:
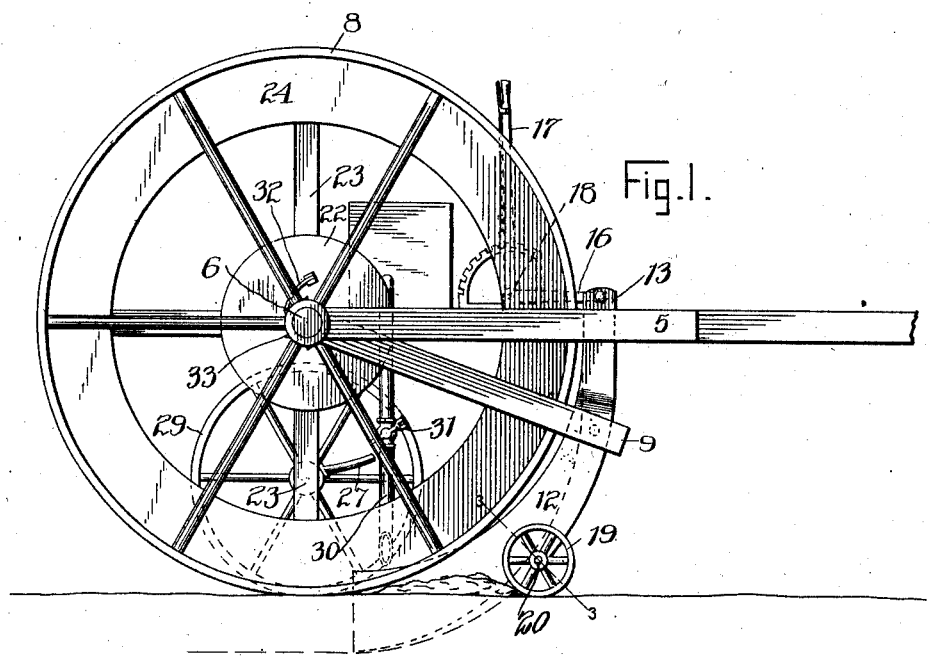

H. R. GLOSSOP.
PLANT SETTING DEVICE.
APPLICATION FILED OCT. 3, 1911.

1,044,374.

Patented Nov. 12, 1912.

WITNESSES
C. H. Reichenbach
E. B. Marshall

INVENTOR
Henry R. Glossop
BY Munn & Co
ATTORNEYS

UNITED STATES PATENT OFFICE.

HENRY ROYLE GLOSSOP, OF FRIDAY HARBOR, WASHINGTON.

PLANT-SETTING DEVICE.

1,044,374.  Specification of Letters Patent.  Patented Nov. 12, 1912.

Application filed October 3, 1911. Serial No. 652,492.

*To all whom it may concern:*

Be it known that I, HENRY R. GLOSSOP, a citizen of the United States, and a resident of Friday Harbor, in the county of San Juan and State of Washington, have invented a new and Improved Plant-Setting Device, of which the following is a full, clear, and exact description.

My invention relates to plant setting devices, and it has for its object to provide one with a rotatable member with clamps for holding the plants, the clamps being opened by a trip when the plants carried by the clamps are disposed in a furrow in the rear of a furrow opener. Press wheels are secured to the device for filling the furrow after the plants have been disposed in position and a water nozzle is opened periodically to supply each plant with water as the device is moved along the ground.

Additional objects of the invention will appear in the following complete specification in which the preferred form of the invention is disclosed.

In the drawings similar characters of reference indicate corresponding parts in all the views in which—

Figure 2:
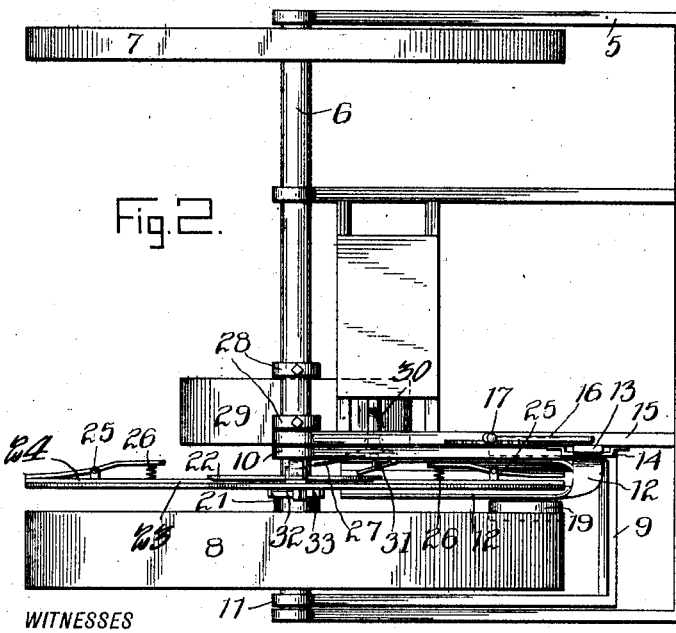
Figure 3:
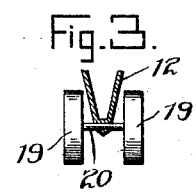
Figure 4:
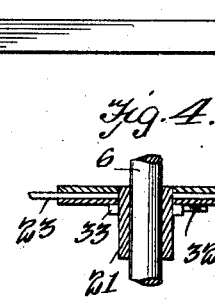

Figure 1 is a side elevation of my invention; Fig. 2 is a plan view of Fig. 1; Fig. 3 is a sectional view on the line 3—3 of Fig. 1, and Fig. 4 is a fragmentary sectional view showing how the arms 23 are engaged by the two disks 22.

By referring to the drawings it will be seen that secured to the rectangular frame 5 there is an axle 6 on which wheels 7 and 8 are mounted for rotation. A furrow opener frame 9 is pivoted to the axle 6 at points 10 and 11, and secured to one side of this furrow opener frame 9 there is a V-shaped curved furrow opener 12, having a tongue 13 which is disposed through a strap 14 secured to a member 15 of the rectangular frame 5. To this tongue 13 is articulated an arm 16 of a lever 17 the lever being fulcrumed at 18 to the member 15, of the frame. Wheels 19 are mounted on an axle 20 secured to the curved V-shaped furrow opener 12 for assisting in supporting the furrow opener in a predetermined position relatively to the ground. Mounted on the inwardly extending hub 21 of the wheel 8 there are two disks 22, between which are clamped arms 23 which support the circular carrying member 24 to which the clamps 25 are secured, these clamps 25 having springs 26 for holding them yieldingly closed. The circular carrying member 24 is so proportioned and disposed that when it rotates the clamps are carried in close proximity to the curved furrow opener at the front of the device so that when the plants are disposed in the clamps 25, with their roots extending outwardly therefrom, the roots will travel down the curved V-shaped furrow opener 12 at the front of the device, so that when the clamps reach the trip 27 they will be opened, permitting the plants to fall in the furrow immediately in the rear of the curved V-shaped furrow opener 12.

The wheel 8 which is disposed at one side of the longitudinal plane of the furrow is considerably wider than the width of the wheel 7, so that the said wheel 8 will serve as a press wheel to press the dirt down at one side of the plants when they are disposed in the furrow. Two depending brackets 28 are secured to the shaft 6 one of these depending brackets being bent and both of the brackets being provided with bearings to receive the shaft in which the press wheel 29 is mounted, this press wheel 29 being disposed at the other side of the curved V-shaped furrow opener 12 so that the press wheel 29 and the wheel 8 will press the dirt down at both sides of the plants to fill the furrow. A depending nozzle 30 is mounted on the frame 5 in the path of the furrow, and a valve 31 is provided for opening and closing the communication to the said nozzle 30, this valve 31 being operated by the clamps 26 as they rotate to supply each plant with water or liquid manure as it is disposed in the furrow. Ratchet teeth 33 are secured to the hub 21 of the wheel 8, and these ratchet teeth 33 are engaged by a spring pawl 32, which is secured to one of the disks 22. These ratchet teeth 33 with the spring pawl 32, while permitting the disks and the circular carrying member 24 to rotate, with the hub 21, when the device is moved in one direction, will prevent the rotation of the disk 22 and the carrying member 24 when the device is moved rearwardly.

Having thus described my invention I claim as new, and desire to secure by Letters Patent:

1. In a plant setting device an axle, wheels mounted on the axle, a furrow opener frame pivoted relatively to the axle and extending forwardly, a furrow opener curved downwardly and rearwardly, and secured to the frame, and means mounted for revolving on the axle for disposing a plant in the furrow made by the furrow opener.

2. In a plant setting device an axle, wheels mounted on the axle, a furrow opener frame pivoted relatively to the axle and extending forwardly, a furrow opener curved downwardly and rearwardly and secured to the frame, supporting wheels for the furrow opener, and means mounted for revolving on the axle for disposing a plant in the furrow made by the furrow opener.

3. In a plant setting device an axle, wheels mounted on the axle, a furrow opener, a frame pivoted relatively to the axle and extending forwardly, a furrow opener V-shaped in cross section and curved downwardly and rearwardly and secured to the frame, a member mounted to rotate with the axle as its axis, a clamp secured to the last-mentioned member, for carrying a plant, and a trip for operating the clamp to release the plant.

4. In a plant setting device a furrow opener curved downwardly and rearwardly, an axle, means for supporting the furrow opener on the axle, wheels mounted on the axle, one disposed with its tread resting on the ground, at one side of the rear of the furrow opener to serve as a press wheel, and means mounted for revolving with the axle as its axis, for disposing a plant in the furrow made by the furrow opener.

5. In a plant setting device a furrow opener curved downwardly and rearwardly, an axle, means for supporting the furrow opener on the axle, wheels mounted on the axle, one disposed with its tread portion resting on the ground, at one side of the rear of the furrow opener to serve as a press wheel, a frame secured to the axle, and an additional press wheel carried by the frame for coöperating with the first-mentioned wheel serving as a press wheel.

6. In a plant setting device an axle, wheels mounted on the axle, a furrow opener, a frame pivoted relatively to the axle and extending forwardly, a furrow opener V-shaped in cross section and curved downwardly and rearwardly and secured to the frame, a member mounted to rotate with the axle as its axis, a clamp secured to the last-mentioned member, for carrying a plant, and a trip for operating the clamp to release the plant, a nozzle, and a valve for closing the nozzle, having a member disposed in the path of the clamp to be operated thereby.

In testimony whereof I have signed my name to this specification in the presence of two subscribing witnesses.

HENRY ROYLE GLOSSOP.

Witnesses:
E. H. NASH,
R. D. MADDEN.

---

Copies of this patent may be obtained for five cents each, by addressing the "Commissioner of Patents, Washington, D. C."